(12) United States Patent
Wang et al.

(10) Patent No.: US 11,510,093 B2
(45) Date of Patent: Nov. 22, 2022

(54) COORDINATING OVERHEATING ASSISTANCE INFORMATION IN A DUAL CONNECTIVITY CONFIGURATION

(71) Applicant: QUALCOMM Incorporated, San Diego, CA (US)

(72) Inventors: Shanshan Wang, San Diego, CA (US); Xipeng Zhu, San Diego, CA (US); Arvind Vardarajan Santhanam, San Diego, CA (US); Ozcan Ozturk, San Diego, CA (US); Mouaffac Ambriss, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 36 days.

(21) Appl. No.: 17/247,308

(22) Filed: Dec. 7, 2020

(65) Prior Publication Data
US 2021/0250805 A1 Aug. 12, 2021

Related U.S. Application Data

(60) Provisional application No. 62/975,558, filed on Feb. 12, 2020.

(51) Int. Cl.
*H04W 28/02* (2009.01)
*H04W 28/08* (2009.01)
*H04B 7/0452* (2017.01)
*H04L 5/00* (2006.01)

(52) U.S. Cl.
CPC ...... *H04W 28/0284* (2013.01); *H04B 7/0452* (2013.01); *H04L 5/0098* (2013.01); *H04W 28/0247* (2013.01); *H04W 28/0289* (2013.01); *H04W 28/0808* (2020.05); *H04W 28/0835* (2020.05)

(58) Field of Classification Search
CPC .............................. H04W 28/02; H04W 28/08
See application file for complete search history.

(56) References Cited

U.S. PATENT DOCUMENTS

2015/0215944 A1* 7/2015 Kim ................. H04L 5/001
370/329

FOREIGN PATENT DOCUMENTS

WO 2015173718 A1 11/2015

OTHER PUBLICATIONS

International Search Report and Written Opinion—PCT/US2020/063793—ISA/EPO—dated Mar. 16, 2021.

(Continued)

*Primary Examiner* — Sulaiman Nooristany
(74) *Attorney, Agent, or Firm* — Harrity & Harrity, LLP

(57) ABSTRACT

Various aspects of the present disclosure generally relate to wireless communication. In some aspects, a first base station (BS) may receive, from a user equipment (UE), an overheating assistance information communication that indicates a maximum quantity of component carriers, combined between the first BS and a second BS, for the UE. The first BS may transmit, to the second BS, a request to reduce a quantity of component carriers of the second BS configured for the UE such that a total quantity of component carriers, between the first BS and the second BS, configured for the UE satisfies the maximum quantity of component carriers. Numerous other aspects are provided.

30 Claims, 9 Drawing Sheets

(56) References Cited

OTHER PUBLICATIONS

Huawei., et al., "Running CR to 36.331 for NR V2X", 3GPP TSG-RAN WG2 Meeting #108, 3GPP Draft; R2-1915979 V2, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 24, 2020-Feb. 28, 2020, Jan. 23, 2020 (Jan. 23, 2020), XP051844988, Retrieved from the Internet: URL: https://ftp.3gpp.org/Email_Discussions/RAN2/%5BRAN2%23108%5D/%5B108%2328%5D%5BR16%20RRC%5D%20RRC%20Mergej36331/R2-1915979_v2.zip Update R2-1915979 Running CR to 36-331 for NR V2X.docx [retrieved on Jan. 23, 2020], paragraphs [5.6.10.1], [5.6.10.2], [5.6.10.3], [6.2.2].

\* cited by examiner

COORDINATING OVERHEATING ASSISTANCE INFORMATION IN A DUAL CONNECTIVITY CONFIGURATION

CROSS-REFERENCE TO RELATED APPLICATION

This Patent Application claims priority to U.S. Provisional Patent Application No. 62/975,558, filed on Feb. 12, 2020, entitled "COORDINATING OVERHEATING ASSISTANCE INFORMATION IN A DUAL CONNECTIVITY CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for coordinating overheating assistance information in a dual connectivity configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first base station (BS), may include receiving, from a user equipment (UE), an overheating assistance information communication that indicates a maximum quantity of component carriers, combined between the first BS and a second BS, for the UE; and transmitting, to the second BS and based at least in part on receiving the overheating assistance information communication, a request to reduce a quantity of component carriers of the second BS configured for the UE such that a total quantity of component carriers, between the first BS and the second BS, configured for the UE satisfies the maximum quantity of component carriers.

In some aspects, a first BS for wireless communication may include a memory and one or more processors operatively coupled to the memory. The memory and the one or more processors may be configured to receive, from a UE, an overheating assistance information communication that indicates a maximum quantity of component carriers, combined between the first BS and a second BS, for the UE; and transmit, to the second BS and based at least in part on receiving the overheating assistance information communication, a request to reduce a quantity of component carriers of the second BS configured for the UE such that a total quantity of component carriers, between the first BS and the second BS, configured for the UE satisfies the maximum quantity of component carriers.

In some aspects, a non-transitory computer-readable medium may store one or more instructions for wireless communication. The one or more instructions, when executed by one or more processors of a first BS, may cause the one or more processors to receive, from a UE, an overheating assistance information communication that indicates a maximum quantity of component carriers, combined between the first BS and a second BS, for the UE; and transmit, to the second BS and based at least in part on receiving the overheating assistance information communication, a request to reduce a quantity of component carriers of the second BS configured for the UE such that a total quantity of component carriers, between the first BS and the second BS, configured for the UE satisfies the maximum quantity of component carriers.

In some aspects, a first apparatus for wireless communication may include means for receiving, from a UE, an overheating assistance information communication that indicates a maximum quantity of component carriers, combined between the first apparatus and a second apparatus, for the UE; and means for transmitting, to the second apparatus and based at least in part on receiving the overheating assistance information communication, a request to reduce a quantity of component carriers of the second apparatus configured for the UE such that a total quantity of component carriers, between the first apparatus and the second apparatus, configured for the UE satisfies the maximum quantity of component carriers.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as fifth generation (5G) and later, including New Radio (NR) technologies.

Figure 1:
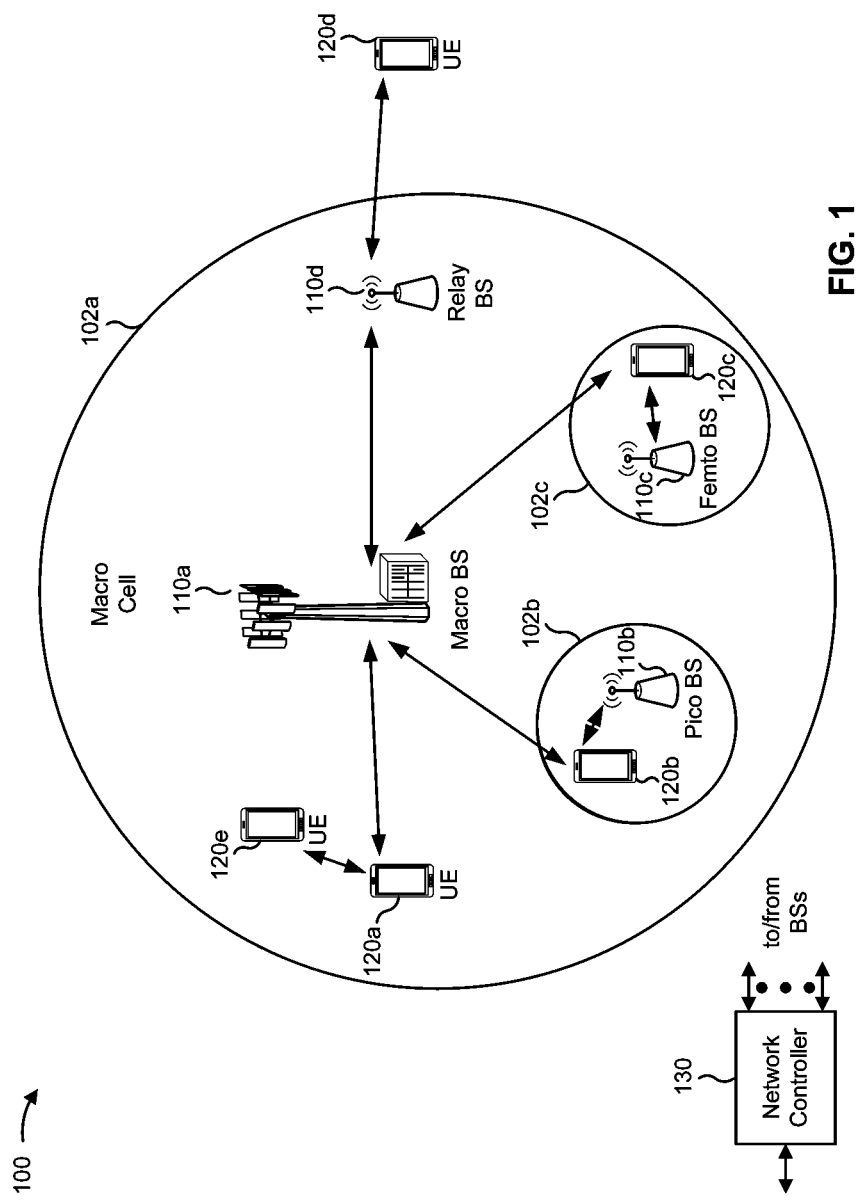
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gB", "TRP", "AP" "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
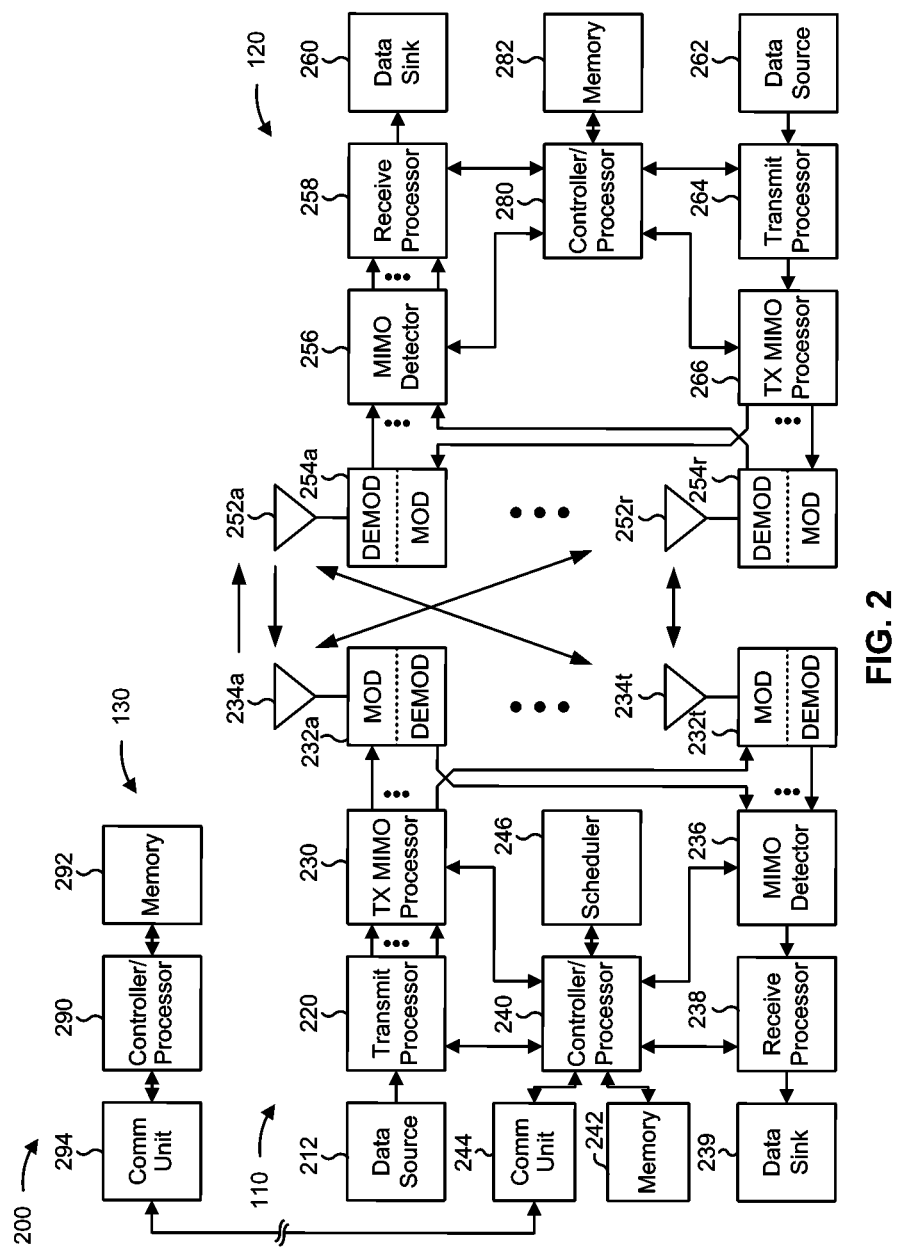
FIG. 2 is a diagram illustrating an example of a base station (BS) in communication with a user equipment in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with coordinating overheating assistance information in a dual connectivity configuration, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, a first BS 110 may include means for receiving, from a UE 120, an overheating assistance information communication that indicates a maximum quantity of component carriers, combined between the first BS 110 and a second BS 110, for the UE 120, means for transmitting, to the second BS 110 and based at least in part on receiving the overheating assistance information communication, a request to reduce a quantity of component carriers of the second BS 110 configured for the UE 120 such that a total quantity of component carriers, between the first BS 110 and the second BS 110, configured for the UE 120 satisfies the maximum quantity of component carriers, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may experience overheating due to high rates of data transfer to the UE, due to the bandwidth of the frequency spectrum used by the UE, due to the quantity of layers activated for the UE, and/or due to other factors. The UE may include a processor that executes an overheating manager application, which may monitor the operating temperature of various components of the UE. The overheating manager application may detect overheating conditions, such as when a monitored operating temperature exceeds a temperature threshold. In some cases, 5G NR networks operate at higher throughput, an increased quantity of layers, an increased frequency spectrum range, and/or the like relative to LTE networks. As a result, 5G NR capable UEs may be more prone to experiencing overheating conditions, which can degrade user experience of the UE, physically damage the UE, and/or the like.

A UE and a BS may mitigate the effects of an overheating condition by reducing various communication parameters of the UE, such as reducing the peak or maximum permitted throughput for the UE, reducing the maximum number of component carriers that are permitted to be configured for the UE, and/or the like. Reducing these and other parameters may reduce the processing burden of the UE, which can reduce operating temperatures of the UE to mitigate the overheating condition.

In some cases, a UE may operate in a dual connectivity configuration in a wireless network. In these cases, the UE may be communicatively connected with, and may receive communications from, two or more BSs. The BSs may support the same RAT or different RATs. In cases where the BSs support different RATs (e.g., a first BS may support an LTE RAT and a second BS may support a 5G NR RAT), different sets of operating assistance parameters may be used for the different RATs. However, the BSs in the dual connectivity deployment may be unable to coordinate the different sets of operating assistance parameters between the BSs for the UE, which may result in inefficient or degraded overheating mitigation for the UE.

Some aspects described herein provide techniques and apparatuses for coordinating overheating assistance information in a dual connectivity configuration. In some aspects described herein, BSs in a dual connectivity configuration may share operating assistance parameters for different types of RATs. For example, an LTE BS may receive a set of LTE operating assistance parameters and a set of 5G NR operating assistance parameters from a UE, and may transmit an indication of the set of LTE operating assistance parameters and the set of 5G NR operating assistance parameters to a 5G NR BS in a dual connectivity configuration with the LTE BS and the UE. This permits the BSs in the dual connectivity configuration to jointly coordinate operating assistance parameters for the UE, which increases the efficiency and performance of overheating mitigation for the UE.

Moreover, in some aspects described herein, some operating assistance parameters may be jointly configured across BSs (e.g., a first BS and a second BS) in a dual connectivity configuration, regardless of whether the BSs are the same RAT or are different RATs. For example, a reducedMaxCCs parameter may be jointly configured for the BSs in a dual connectivity configuration. In these cases, the reducedMaxCCs parameter may indicate a maximum quantity of component carriers, combined between the BSs, that is permitted to be configured or active for a UE. In this way, the BSs may jointly reduce the total quantity of component carriers configured for the UE by deactivating component carriers of the first BS and/or the second BS, by releasing secondary cells (SCells) of the first BS and/or the second BS, and/or the like.

The aspects described herein may be adapted for use in various types of dual connectivity configurations, including an Evolved-Universal Mobile Telecommunications System Terrestrial Radio Access Network (E-UTRAN) NR Dual Connectivity (EN-DC) configuration (where a UE is communicatively connected to an LTE master node (MN) BS and a 5G NR secondary node (SN) BS, and the core network is an LTE evolved packet core), a next generation RAN (NG-RAN) E-UTRA Dual Connectivity (NGEN-DC) configuration (where a UE is communicatively connected to an LTE MN BS and a 5G NR SN BS, and the core network is a 5G core), an NR E-UTRA Dual Connectivity (NE-DC) configuration (where a UE is communicatively connected to a 5G NR MN BS and an LTE SN BS, and the core network is a 5G core), an NR Dual Connectivity (NR-DC) configuration (where a UE is communicatively connected to a 5G NR MN BS and a 5G NR SN BS, and the core network is a 5G core), and/or the like. The aspects described herein may also be adapted for use in multi-connectivity configurations, in which a UE is communicatively connected with more than two BSs.

Figure 3:
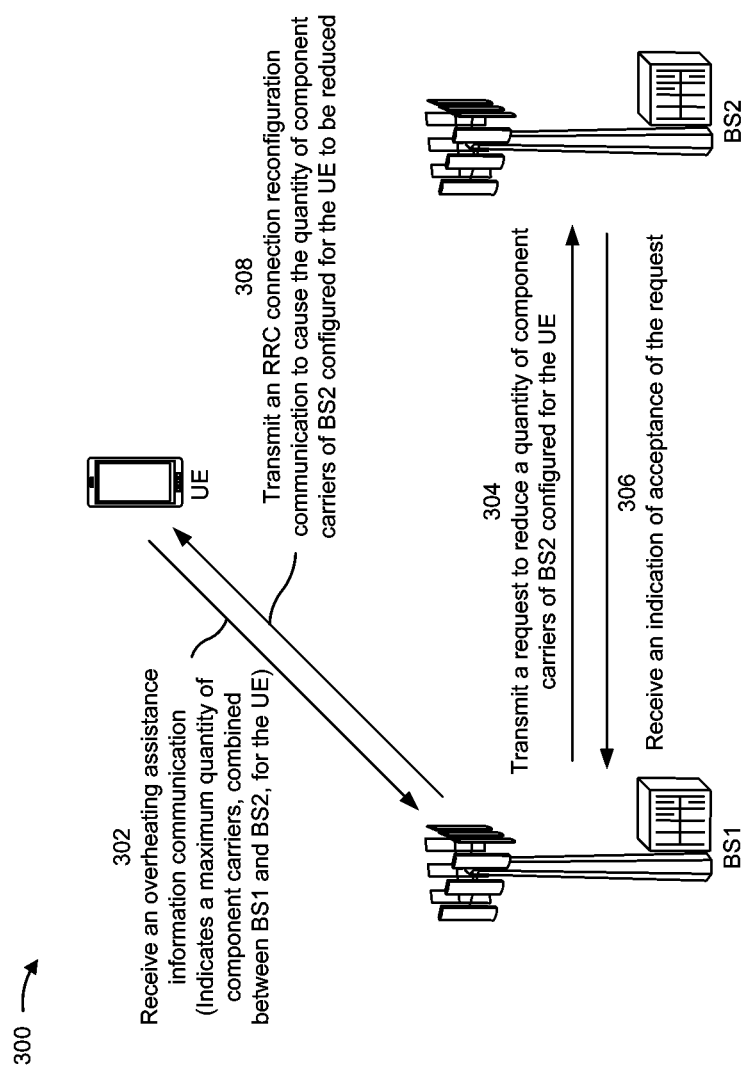
FIGS. 3-6 are diagrams illustrating examples of coordinating overheating assistance information in a dual connectivity configuration, in accordance with various aspects of the present disclosure.

FIG. 3 is a diagram illustrating an example 300 of coordinating overheating assistance information in a dual connectivity configuration, in accordance with various aspects of the present disclosure. As shown in FIG. 3, example 300 may include communication between a UE (e.g., UE 120) and a plurality of BSs (e.g., BSs 110). In some aspects, the UE and the BSs (e.g., BS1 and BS2) may be included in a wireless network, such as wireless network 100. In some aspects, the UE and the plurality of BSs may operate in a dual connectivity configuration, such as a dual connectivity configuration described above. In some aspects, example 300 may include a greater quantity of BSs, in which case the UE and the plurality of BSs may operate in a multi-connectivity configuration.

In some aspects, a processor of the UE (e.g., receive processor 258, transmit processor 264, controller/processor 280, and/or the like) may execute an overheating manager application, which may monitor the operating temperatures of various components of the UE. The overheating manager application may detect overheating conditions, such as when a monitored operating temperature exceeds a temperature threshold.

As shown in FIG. 3, and by reference number 302, the UE may transmit an overheating assistance information communication to BS. In some aspects, the UE may transmit the overheating assistance information communication to BS1 based at least in part on detecting an overheating condition of the UE (e.g., based at least in part on the overheating manager application detecting a monitored operating temperature exceeded a temperature threshold). In some aspects, BS1 may be an MN in the dual connectivity configuration.

In some aspects, the overheating assistance information communication may indicate one or more overheating assistance parameters for the UE. Each of the one or more overheating assistance parameters may be associated with BS1 and/or BS2 (which may be an SN in the dual connectivity configuration). In some aspects, the one or more overheating assistance parameters may include RAT-specific parameters, such as 5G NR specific parameters, LTE specific parameters, and/or the like. RAT-specific parameters may include overheating assistance parameters that are configured and processed separately for BSs of a particular RAT type. For example, if BS1 is an LTE BS, and BS2 is a 5G NR BS, the RAT-specific parameters may include a set of LTE overheating assistance parameters for BS1 and a set of 5G NR overheating assistance parameters for BS2.

Examples of RAT-specific parameters may include an LTE reducedUE-Category parameter (which may indicate a reduced maximum throughput for the UE relative to the maximum throughput permitted for the UE at the time the overheating assistance communication is transmitted), a 5G NR reducedUE-Category parameter, a 5G NR reducedMaxBW-FR1 parameter (which may indicate a reduced maximum NR frequency range 1 (FR1) bandwidth for the UE relative to the maximum NR FR1 bandwidth permitted for the UE at the time the overheating assistance communication is transmitted), a 5G NR reducedMaxBW-FR2 parameter (which may indicate a reduced maximum NR frequency range 2 (FR2) bandwidth for the UE relative to the maximum NR FR2 bandwidth permitted for the UE at the time the overheating assistance communication is transmitted), a 5G NR reducedMaxMIMO-LayersFR1 (which may indicate a reduced maximum quantity of FR1 MIMO layers for the UE relative to the maximum quantity of FR1 MIMO layers permitted for the UE at the time the overheating assistance communication is transmitted), a 5G NR reducedMaxMIMO-LayersFR2 (which may indicate a reduced maximum quantity of FR2 MIMO layers for the UE relative to the maximum quantity of FR2 MIMO layers permitted for the UE at the time the overheating assistance communication is transmitted), and/or the like.

In some aspects, the RAT-specific parameters may further be specific to an uplink or to a downlink. For example, the RAT-specific parameters may include an uplink LTE reducedUE-Category (reducedUE-CategoryUL) and a downlink LTE reducedUE-Category (reducedUE-CategoryDL), an uplink 5G NR reducedUE-Category (reducedUE-CategoryUL) and a downlink 5G NR reducedUE-Category (reducedUE-CategoryDL), an uplink 5G NR reducedBW-FR1 (reducedBW-FR1-UL) and a downlink 5G NR reducedBW-FR1 (reducedBW-FR1-DL), an uplink 5G NR reducedBW-FR2 (reducedBW-FR2-UL) and a downlink 5G NR reducedBW-FR2 (reducedBW-FR2-DL), an uplink 5G NR reducedMIMO-LayersFR1 (reducedMIMO-LayersFR1-UL) and a downlink 5G NR reducedMIMO-LayersFR1 (reducedMIMO-LayersFR1-DL), an uplink 5G NR reducedMIMO-LayersFR2 (reducedMIMO-LayersFR2-UL) and a downlink 5G NR reducedMIMO-LayersFR2 (reducedMIMO-LayersFR2-DL), and/or the like.

In some aspects, the one or more overheating assistance parameters may include one or more shared, combined, and/or jointly coordinated parameters. For example, the one or more overheating assistance parameters may include a reducedMaxCCs parameter, which may indicate a reduced maximum quantity of component carriers, combined between BS1 and BS2, that is permitted to be configured or active for the UE (e.g., relative to the maximum quantity of component carriers permitted for the UE at the time that the overheating assistance information communication is transmitted). The combination of the quantity of component carriers of BS1 configured or active for the UE, and the quantity of component carriers of BS2 configured or active for the UE, is to satisfy the reduced maximum quantity of component carriers indicated by the reducedMaxCCs parameter.

In some aspects, the reducedMaxCCs parameter may include an uplink component (e.g., reducedMaxCCs-UL) and a downlink component (e.g., reducedMaxCCs-DL). The uplink component may indicate a reduced maximum quantity of uplink component carriers, combined between BS1 and BS2, that is permitted to be configured or active for the UE, and the downlink component may indicate a reduced maximum quantity of downlink component carriers, combined between BS1 and BS2, that is permitted to be configured or active for the UE.

As further shown in FIG. 3, and by reference number 304, BS1 may transmit a request to reduce the quantity of component carriers of BS2 configured or active for the UE. In some aspects, the request may indicate that BS2 is to reduce the overall quantity of component carriers configured or active for the UE. In some aspects, the request may specify that BS2 is to reduce the quantity of downlink component carriers and/or the quantity of uplink component carriers configured or active for the UE.

In some aspects, BS1 may further transmit an indication of the one or more overheating assistance parameters to BS2. In some aspects, the indication may include all of the overheating assistance parameters included in the overheating assistance information communication. In some aspects, the indication may include a subset of the overheating assistance parameters included in the overheating assistance information communication. For example, BS1 may transmit an indication of the reducedMaxCCs parameter (or the reducedMaxCCs-UL and the reducedMaxCCs-DL parameters) as well as any overheating assistance information parameters specific to BS2 (e.g., which may include one or more RAT-specific parameters).

BS2 may receive the request from BS1 and may accept the request or reject the request. If BS2 rejects the request, BS2 may transmit a response to the request that may indicate the rejection and a proposed configuration for reducing the quantity of component carriers of BS2 (e.g., a proposed reduced quantity of (uplink and/or downlink) component carriers for BS2, a proposed specific set of component carriers to be deactivated, a proposed specific set of (uplink and/or downlink) SCells to be released for BS2, and/or the like). If BS1 agrees with the proposed configuration, BS1 may modify the request to include the proposed configuration and may retransmit the request to BS2. This negotiation may continue until BS1 and BS2 agree on a configuration for reducing the quantity of component carriers of BS2 configured for the UE.

As further shown in FIG. 3, and by reference number 306, BS2 may transmit an indication of acceptance of the request to BS1, and BS1 may receive the indication of the acceptance of the request. As shown by reference number 308, BS1 may transmit a radio resource control (RRC) connection reconfiguration communication to the UE to cause the quantity of component carriers of BS2, configured for the UE, to be reduced to satisfy the reducedMaxCCs parameter of the UE. For example, BS2 and the UE may deactivate one or more uplink and/or downlink component carriers of BS2 for the UE, which may reduce the throughput and/or frequency bandwidth to be monitored and processed by the UE, which may reduce the operating temperatures of the UE.

In this way, BSs in a dual connectivity configuration may share operating assistance parameters for different types of RATs. This permits the BSs in the dual connectivity configuration to jointly coordinate operating assistance parameters, which increases the efficiency and performance of overheating mitigation for the UE.

As indicated above, FIG. 3 is provided as an example. Other examples may differ from what is described with respect to FIG. 3.

Figure 4:
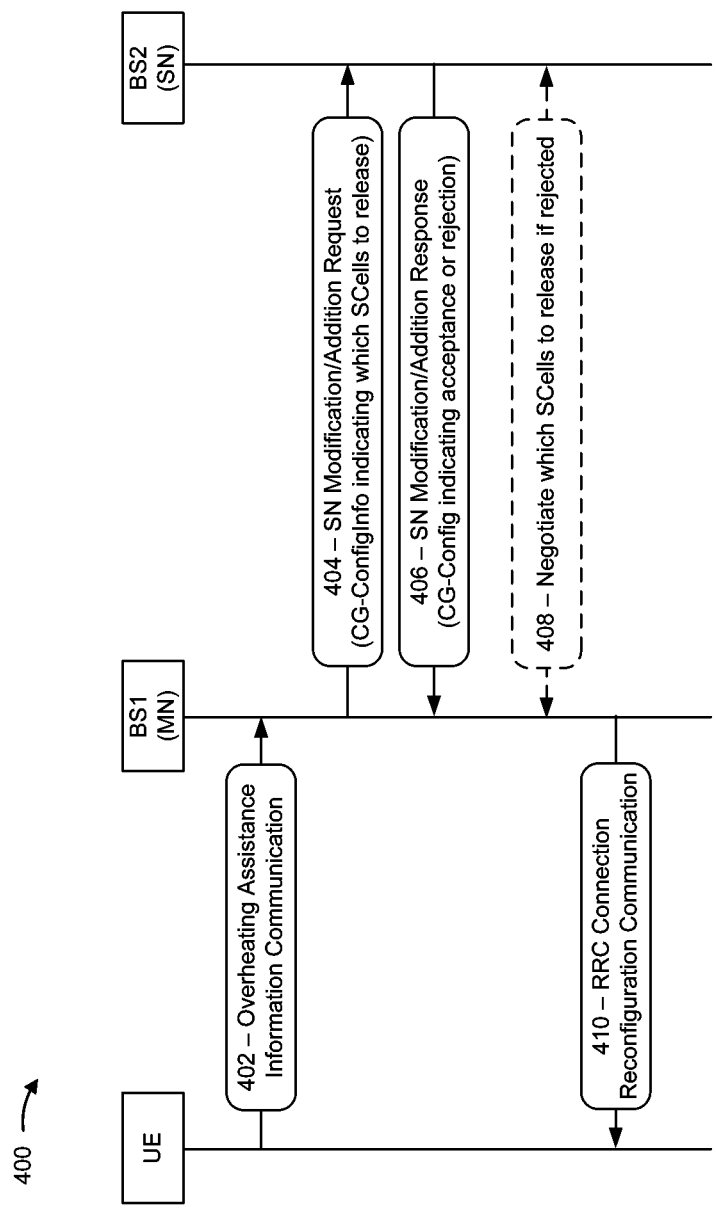

FIG. 4 is a diagram illustrating an example 400 of coordinating overheating assistance information in a dual connectivity configuration, in accordance with various aspects of the present disclosure. As shown in FIG. 4, example 400 may include communication between a UE (e.g., UE 120) and a plurality of BSs (e.g., BSs 110). In some aspects, the UE and the BSs (e.g., BS1 and BS2) may be included in a wireless network, such as wireless network 100. In some aspects, the UE and the plurality of BSs may operate in a dual connectivity configuration, such as a dual connectivity configuration described above. BS1 may be an MN in the dual connectivity configuration, and BS2 may be an SN in the dual connectivity configuration. In some aspects, example 400 may include a greater quantity of BSs, in which case the UE and the plurality of BSs may operate in a multi-connectivity configuration.

In some aspects, a processor of the UE (e.g., receive processor 258, transmit processor 264, controller/processor 280, and/or the like) may execute an overheating manager application, which may monitor the operating temperature of various components of the UE. The overheating manager application may detect overheating conditions, such as when a monitored operating temperature exceeds a temperature threshold.

As shown in FIG. 4, and by reference number 402, the UE may transmit an overheating assistance information communication to BS. In some aspects, the UE may transmit the overheating assistance information communication to BS1 based at least in part on detecting an overheating condition of the UE (e.g., based at least in part on the overheating manager application detecting a monitored operating temperature exceeded a temperature threshold). In some aspects, the overheating assistance information communication may include an indication of one or more overheating assistance parameters, such as one or more of the RAT-specific parameters and shared parameters described above in connection with FIG. 3. In some aspects, the overheating assistance information communication may be an RRC UEAssistanceInformation communication.

As further shown in FIG. 4, and by reference number 404, BS1 may transmit an SN modification/addition request to BS2. The SN modification/addition request may function as a request to reduce the quantity of component carriers of BS2 configured or active for the UE. In some aspects, BS1 may transmit the SN modification/addition request via a backhaul between BS1 and BS2, such as an Xn interface backhaul, an X2 interface backhaul, and/or the like.

In some aspects, the SN modification/addition request may include one or more information elements (IEs), such as a CG-ConfigInfo IE. The CG-ConfigInfo IE may indicate which SCells that BS2 is to release to reduce the quantity of component carriers of BS2 configured or active for the UE. In this case, the indicated SCell(s) may be uplink SCell(s) and/or downlink SCell(s). In some aspects, each of the downlink SCell(s) may be indicated in an sCellToReleaseList IE included in the CG-ConfigInfo IE, and may be indicated by an associated SCell index. In some aspects, each of the uplink SCell(s) may be indicated in an sCellToReleaseList-UL IE included in the CG-ConfigInfo IE, and may be indicated by an associated SCell index.

As further shown in FIG. 4, and by reference number 406, BS2 may transmit an SN modification/addition response to BS1 based at least in part on receiving the SN modification/addition request. In some aspects, BS2 may transmit the SN modification/addition response to BS1 via the backhaul. In some aspects, the SN modification/addition response may include a CG-ConfigInfo IE indicating acceptance or rejection of the request.

As further shown in FIG. 4, and by reference number 408, if BS2 rejects the request, BS1 and BS2 may negotiate which SCells that BS2 is to release. For example, BS2 may include a proposed set of SCells to release in the CG-ConfigInfo IE of the SN modification/addition response. BS1 may receive the SN modification/addition response and may modify the request based at least in part on the proposed set of SCells. BS1 may retransmit the request to BS2 after modifying the request. In some aspects, BS1 may modify the request to include the proposed set of SCells or a different set of SCells. BS2 may receive the retransmitted request and may accept or reject the retransmitted request. BS1 and BS2 may continue to negotiate which SCells that BS2 is to release until BS1 and BS2 agree on which SCells that BS2 is to release.

As further shown in FIG. 4, and by reference number 410, BS1 may transmit an RRC connection reconfiguration communication to the UE. In some aspects, BS1 may transmit the RRC connection reconfiguration communication to the UE based at least in part on receiving, from BS2, an indication of an acceptance of the request. In some aspects, the RRC connection reconfiguration communication may indicate which SCells that BS2 is to release for the UE. In some aspects, the UE and the BS2 may release the agreed upon SCells of BS2 based at least in part on the RRC connection reconfiguration.

As indicated above, FIG. 4 is provided as an example. Other examples may differ from what is described with respect to FIG. 4.

Figure 5:
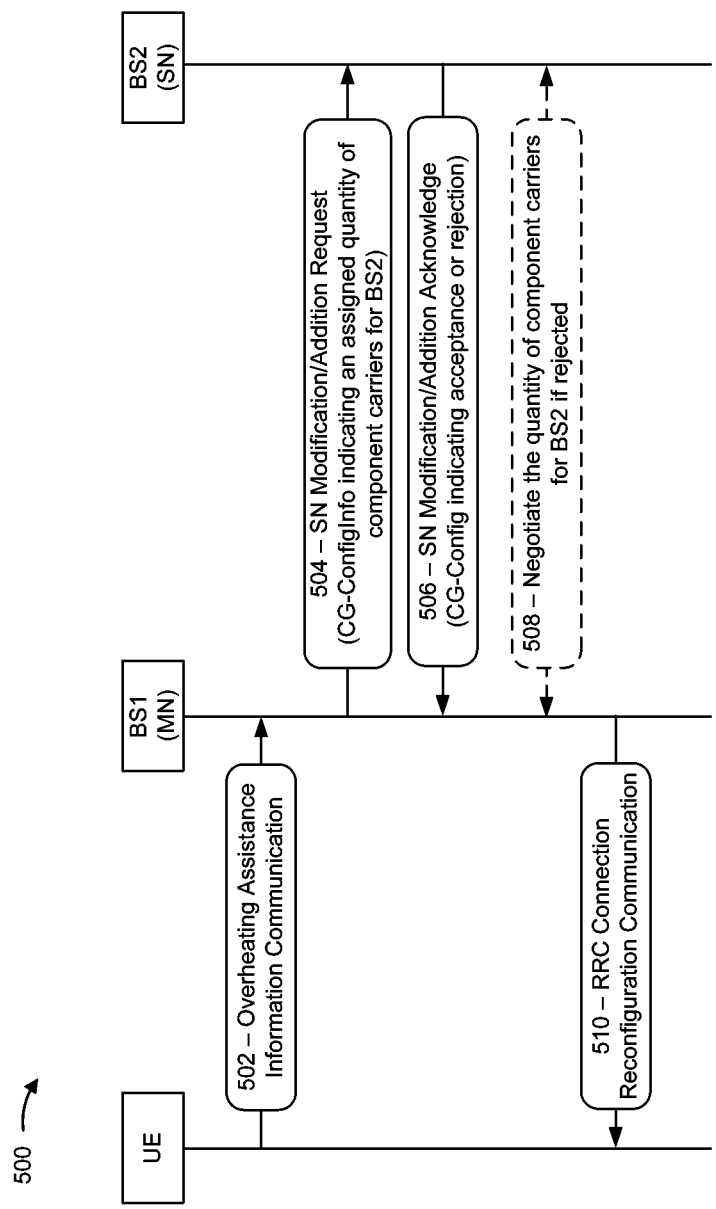

FIG. 5 is a diagram illustrating an example 500 of coordinating overheating assistance information in a dual connectivity configuration, in accordance with various aspects of the present disclosure. As shown in FIG. 5, example 500 may include communication between a UE (e.g., UE 120) and a plurality of BSs (e.g., BSs 110). In some aspects, the UE and the BSs (e.g., BS1 and BS2) may be included in a wireless network, such as wireless network 100. In some aspects, the UE and the plurality of BSs may operate in a dual connectivity configuration, such as a dual connectivity configuration described above. BS1 may be an MN in the dual connectivity configuration, and BS2 may be an SN in the dual connectivity configuration. In some aspects, example 400 may include a greater quantity of BSs, in which case the UE and the plurality of BSs may operate in a multi-connectivity configuration.

In some aspects, a processor of the UE (e.g., receive processor 258, transmit processor 264, controller/processor 280, and/or the like) may execute an overheating manager application, which may monitor the operating temperature of various components of the UE. The overheating manager application may detect overheating conditions, such as when a monitored operating temperature exceeds a temperature threshold.

As shown in FIG. 5, and by reference number 502, the UE may transmit an overheating assistance information communication to BS. In some aspects, the UE may transmit the overheating assistance information communication to BS1 based at least in part on detecting an overheating condition of the UE (e.g., based at least in part on the overheating manager application detecting a monitored operating temperature exceeded a temperature threshold). In some aspects, the overheating assistance information communication may include an indication of one or more overheating assistance parameters, such as one or more of the RAT-specific parameters and shared parameters described above in connection with FIG. 3. In some aspects, the overheating assistance information communication may be an RRC UEAssistanceInformation communication.

As further shown in FIG. 5, and by reference number 504, BS1 may transmit an SN modification/addition request to BS2. The SN modification/addition request may function as a request to reduce the quantity of component carriers of BS2 configured or active for the UE. In some aspects, BS1 may transmit the SN modification/addition request via a backhaul between BS1 and BS2, such as an Xn interface backhaul, an X2 interface backhaul, and/or the like.

In some aspects, the SN modification/addition request may include one or more IEs, such as a CG-ConfigInfo IE. The CG-ConfigInfo IE may indicate an assigned quantity of component carriers of BS2 for the UE. BS2 may release component carriers of BS2 for the UE to satisfy the assigned quantity of component carriers. In some aspects, the assigned quantity of component carriers may be indicated in a reducedMaxCCs_SN IE in the CG-ConfigInfo IE.

As further shown in FIG. 5, and by reference number 506, BS2 may transmit an SN modification/addition response to BS1 based at least in part on receiving the SN modification/addition request. In some aspects, BS2 may transmit the SN modification/addition acknowledge to BS1 via the backhaul. In some aspects, the SN modification/addition acknowledge may include a CG-ConfigInfo IE indicating acceptance or rejection of the request.

As further shown in FIG. 5, and by reference number 508, if BS2 rejects the request, BS1 and BS2 may negotiate the assigned quantity of component carriers. For example, BS2 may include a proposed assigned quantity of component carriers in the CG-ConfigInfo IE of the SN modification/addition acknowledgement. BS1 may receive the SN modification/addition acknowledgement and may modify the request based at least in part on the proposed assigned quantity of component carriers. BS1 may retransmit the request to BS2 after modifying the request. In some aspects, BS1 may modify the request to include the proposed assigned quantity of component carriers or a different assigned quantity of component carriers. BS2 may receive the retransmitted request and may accept or reject the retransmitted request. BS1 and BS2 may continue to negotiate the assigned quantity of component carriers of BS2 for the UE until BS1 and BS2 agree on the assigned quantity of component carriers.

As further shown in FIG. 5, and by reference number 510, BS1 may transmit an RRC connection reconfiguration communication to the UE. In some aspects, BS1 may transmit the RRC connection reconfiguration communication to the UE based at least in part on receiving, from BS2, an indication of an acceptance of the request. In some aspects, the RRC connection reconfiguration communication may indicate the assigned quantity of component carriers of BS2 for the UE. In some aspects, the UE and the BS2 may deactivate component carriers of BS2, based at least in part on the RRC connection reconfiguration, to satisfy the assigned quantity of component carriers of BS2 for the UE.

As indicated above, FIG. 5 is provided as an example. Other examples may differ from what is described with respect to FIG. 5.

Figure 6:
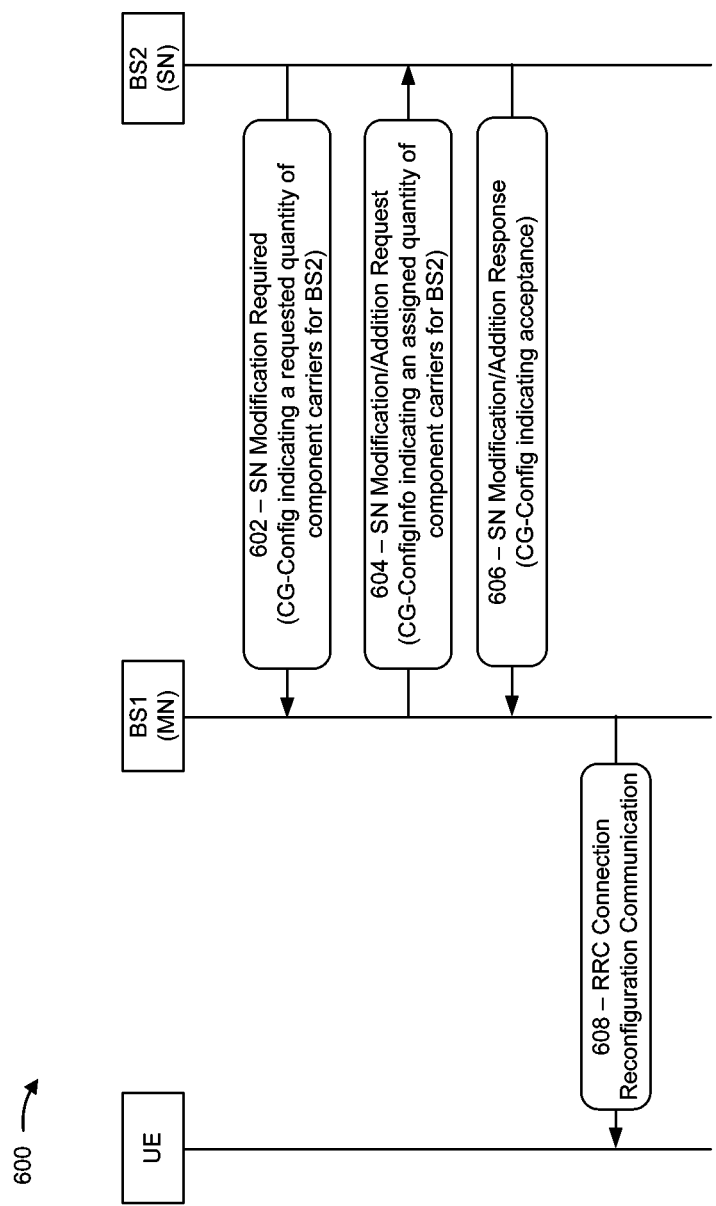

FIG. 6 is a diagram illustrating an example 600 of coordinating overheating assistance information in a dual connectivity configuration, in accordance with various aspects of the present disclosure. As shown in FIG. 6, example 600 may include communication between a UE (e.g., UE 120) and a plurality of BSs (e.g., BSs 110). In some aspects, the UE and the BSs (e.g., BS1 and BS2) may be included in a wireless network, such as wireless network 100. In some aspects, the UE and the plurality of BSs may operate in a dual connectivity configuration, such as a dual connectivity configuration described above. BS1 may be an MN in the dual connectivity configuration, and BS2 may be an SN in the dual connectivity configuration. In some aspects, example 400 may include a greater quantity of BSs, in which case the UE and the plurality of BSs may operate in a multi-connectivity configuration.

In some aspects, a processor of the UE (e.g., receive processor 258, transmit processor 264, controller/processor 280, and/or the like) may execute an overheating manager application, which may monitor the operating temperature of various components of the UE. The overheating manager application may detect overheating conditions, such as when a monitored operating temperature exceeds a temperature threshold.

In some aspects, the UE may transmit an overheating assistance information communication to BS1. In some aspects, the UE may transmit the overheating assistance information communication to BS1 based at least in part on detecting an overheating condition of the UE (e.g., based at least in part on the overheating manager application detecting a monitored operating temperature exceeded a temperature threshold). In some aspects, the overheating assistance information communication may include an indication of one or more overheating assistance parameters, such as one or more of the RAT-specific parameters and shared parameters described above in connection with FIG. 3. In some aspects, the overheating assistance information communication may be an RRC UEAssistanceInformation communication.

In some aspects, BS1 may cause BS2 to reduce the quantity of component carriers of BS2 for the UE to satisfy a maximum quantity of component carriers, combined between BS1 and BS2, that is permitted to be configured for the UE. In some aspects, BS1 may cause BS2 to reduce the quantity of component carriers of BS2 for the UE by transmitting an indication of an assigned quantity of component carriers of BS2 for the UE, as described above in connection with FIG. 5. In some aspects, BS1 may cause BS2 to reduce the quantity of component carriers of BS2 for the UE by transmitting an indication to release one or more SCells of BS2 configured for the UE, as described above in connection with FIG. 4.

As shown in FIG. 6, and by reference number 602, BS2 may initiate negotiation of an assigned quantity of component carriers of BS2 for the UE. In some aspects, BS2 may initiate the negotiation after accepting the assigned quantity of component carriers of BS2 for the UE or after accepting the one or more SCells to be released. In some aspects, BS2 may initiate the negotiation after identifying or determining a different quantity of component carriers (e.g., due to changing wireless network conditions, due to a change in configuration of BS2, and/or due to other factors) than the agreed upon assigned quantity of component carriers. In some aspects, BS2 may initiate the negotiation after identifying or determining a different quantity of component carriers than the component carriers associated with the agreed upon SCells to be released.

In some aspects, BS2 may initiate the negotiation by transmitting an SN modification/addition required to BS1. In some aspects, BS2 may transmit the SN modification/addition required via a backhaul between BS1 and BS2, such as an Xn interface backhaul, an X2 interface backhaul, and/or the like. In some aspects, the SN modification/addition required may include one or more IEs, such as a CG-Config IE. The CG-Config IE may indicate a proposed assigned quantity of component carriers of BS2 for the UE. In some aspects, the proposed assigned quantity of component carriers may be indicated in a reducedMaxCCs_SN IE in the CG-Config IE.

As further shown in FIG. 6, and by reference number 604, BS1 may receive the SN modification/addition required and may transmit an SN modification/addition request to BS2. In some aspects, BS1 may transmit the SN modification/addition request via a backhaul between BS1 and BS2.

In some aspects, the SN modification/addition request may include one or more IEs, such as a CG-ConfigInfo IE. The CG-ConfigInfo IE may indicate an assigned quantity of component carriers of BS2 for the UE. In some aspects, the assigned quantity of component carriers of the BS2 for the UE may be based at least in part on the proposed assigned quantity of component carriers indicated in the SN modification required. In some aspects, the assigned quantity of component carriers may be indicated in a reducedMaxCCs_SN IE in the CG-ConfigInfo IE.

As further shown in FIG. 6, and by reference number 606, BS2 may receive the SN modification/addition request and may accept the assigned quantity of component carriers by transmitting an SN modification/addition response to BS2. In some aspects, BS1 may transmit the SN modification/addition request via the backhaul between BS1 and BS2. In some aspects, the SN modification/addition request may include a CG-Config IE that indicates acceptance of the assigned quantity of component carriers.

As further shown in FIG. 6, and by reference number 608, BS1 may transmit an RRC connection reconfiguration communication to the UE. In some aspects, BS1 may transmit the RRC connection reconfiguration communication to the UE based at least in part on receiving, from BS2, an indication of an acceptance of the request. In some aspects, the RRC connection reconfiguration communication may indicate the assigned quantity of component carriers of BS2 for the UE. In some aspects, the UE and the BS2 may deactivate component carriers of BS2, based at least in part on the RRC connection reconfiguration, to satisfy the assigned quantity of component carriers of BS2 for the UE.

As indicated above, FIG. 6 is provided as an example. Other examples may differ from what is described with respect to FIG. 6.

Figure 7:
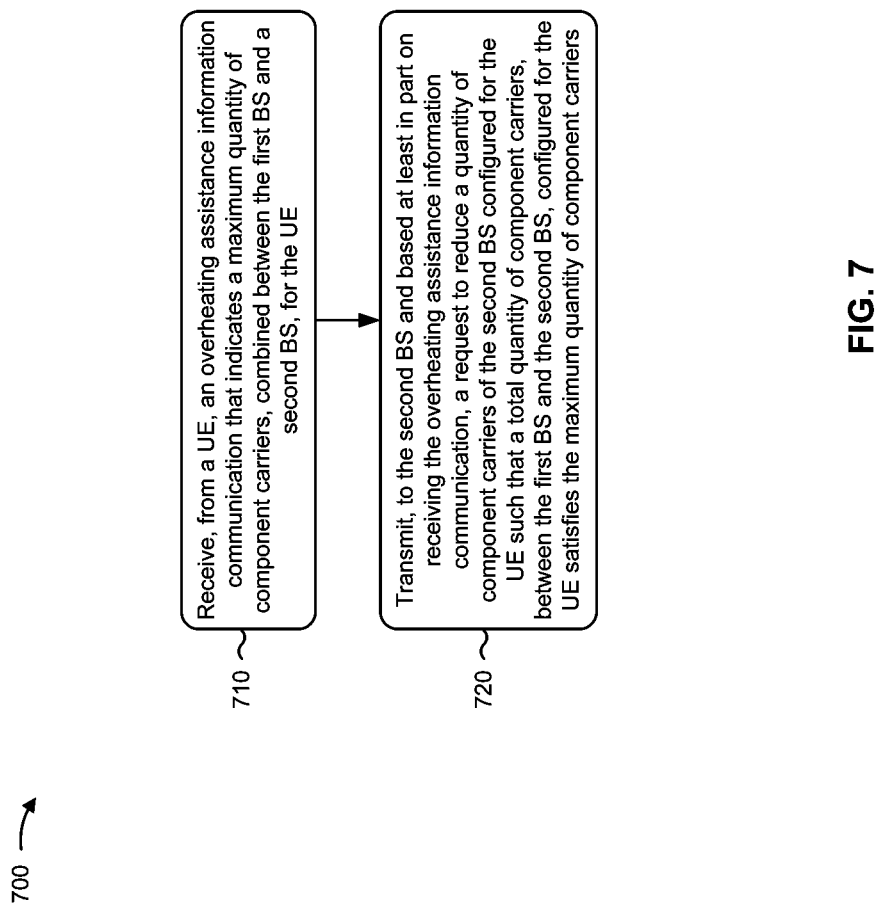
FIG. 7 is a diagram illustrating an example process performed, for example, by a BS, in accordance with various aspects of the present disclosure.

FIG. 7 is a diagram illustrating an example process 700 performed, for example, by a first BS, in accordance with various aspects of the present disclosure. Example process 700 is an example where the first BS (e.g., BS 110 illustrated and described above in connection with FIGS. 1 and 2, a BS illustrated and described above in one or more of FIGS. 3-6, and/or the like) performs operations associated with coordinating overheating assistance information in a dual connectivity configuration.

As shown in FIG. 7, in some aspects, process 700 may include receiving, from a UE, an overheating assistance information communication that indicates a maximum quantity of component carriers, combined between the first BS and a second BS, for the UE (block 710). For example, the first BS (e.g., using transmit processor 220, receive processor 238, controller/processor 240, memory 242, and/or the like) may receive, from a UE, an overheating assistance information communication that indicates a maximum quantity of component carriers, combined between the first BS and a second BS, for the UE, as described above.

As further shown in FIG. 7, in some aspects, process 700 may include transmitting, to the second BS and based at least in part on receiving the overheating assistance information communication, a request to reduce a quantity of component carriers of the second BS configured for the UE such that a total quantity of component carriers, between the first BS and the second BS, configured for the UE satisfies the maximum quantity of component carriers (block 720). For example, the first BS (e.g., using transmit processor 220, receive processor 238, controller/processor 240, memory 242, and/or the like) may transmit, to the second BS and based at least in part on receiving the overheating assistance information communication, a request to reduce a quantity of component carriers of the second BS configured for the UE such that a total quantity of component carriers, between the first BS and the second BS, configured for the UE satisfies the maximum quantity of component carriers, as described above.

Process 700 may include additional aspects, such as any single aspect or any combination of aspects described below and/or in connection with one or more other processes described elsewhere herein.

In a first aspect, transmitting the request comprises transmitting the request via an Xn backhaul interface or an X2 backhaul interface. In a second aspect, alone or in combination with the first aspect, process 700 includes transmitting, to the second BS, an indication of one or more overheating assistance parameters indicated in the overheating assistance information communication, wherein the one or more overheating assistance parameters include at least one of the maximum quantity of component carriers, a maximum throughput for the UE, a maximum NR FR1 bandwidth for the UE, a maximum NR FR2 bandwidth for the UE, a maximum quantity of FR1 MIMO layers for the UE, or a maximum quantity of FR2 MIMO layers for the UE.

In a third aspect, alone or in combination with one or more of the first and second aspects, the maximum quantity of component carriers includes at least one of a maximum quantity of downlink component carriers, combined between the first BS and the second BS, for the UE, or a maximum quantity of uplink component carriers, combined between the first BS and the second BS, for the UE, and the request to reduce the quantity of component carriers of the second BS configured for the UE comprises: a request to release one or more downlink SCells of the second BS for the UE, or a request to release one or more uplink SCells of the second BS for the UE. In a fourth aspect, alone or in combination with one or more of the first through third aspects, the one or more downlink SCells are indicated in an sCellToReleaseList information element, and the one or more uplink SCells are indicated in an sCellToReleaseList-UL information element.

In a fifth aspect, alone or in combination with one or more of the first through fourth aspects, process 700 includes receiving, from the second BS, an indication of a rejection of the request to reduce the quantity of component carriers of the second BS configured for the UE; modifying the request to reduce the quantity of component carriers of the second BS configured for the UE based at least in part on receiving the indication of the rejection; retransmitting, to the second BS, the request to reduce the quantity of component carriers of the second BS configured for the UE after modifying the request to reduce the quantity of component carriers of the second BS configured for the UE; and receiving, from the second BS, the indication of the acceptance of the request to reduce the quantity of component carriers of the second BS configured for the UE based at least in part on retransmitting the request to reduce the quantity of component carriers of the second BS configured for the UE.

In a sixth aspect, alone or in combination with one or more of the first through fifth aspects, the rejection of the request indicates at least one of: one or more different downlink SCells in an sCellToReleaseList information element, or one or more different uplink SCells in an sCellToReleaseList-UL information element. In a seventh aspect, alone or in combination with one or more of the first through sixth aspects, the request to reduce the quantity of component carriers of the second BS configured for the UE comprises an indication of a reduced quantity of component carriers of the second BS for the UE, where the reduced quantity of component carriers is indicated in a reducedMaxCCs_SN information element.

In an eighth aspect, alone or in combination with one or more of the first through seventh aspects, process 700 includes receiving, from the second BS, an indication of a different reduced quantity of component carriers of the second BS for the UE; modifying the request to reduce the quantity of component carriers of the second BS configured for the UE based at least in part on the different reduced quantity of component carriers of the second BS for the UE; retransmitting, to the second BS, the request to reduce the quantity of component carriers of the second BS configured for the UE after modifying the request to reduce the quantity of component carriers of the second BS configured for the UE; and receiving, from the second BS, the indication of the acceptance of the request to reduce the quantity of component carriers of the second BS configured for the UE based at least in part on retransmitting the request to reduce the quantity of component carriers of the second BS configured for the UE.

In a ninth aspect, alone or in combination with one or more of the first through eighth aspects, the different reduced quantity of component carriers is indicated in a reducedMaxCCs_SN information element of an SN modification/addition request acknowledgement communication, and the SN modification/addition request acknowledgement communication indicates rejection of the request to reduce the quantity of component carriers of the second BS configured for the UE. In a tenth aspect, alone or in combination with one or more of the first through ninth aspects, the different reduced quantity of component carriers is indicated in a reducedMaxCCs_SN information element of a secondary node modification required communication.

In an eleventh aspect, alone or in combination with one or more of the first through tenth aspects, the UE, the first BS, and the second BS are deployed in a dual connectivity configuration; the first BS is a 5G NR BS or an LTE BS, and the second BS is a 5G NR BS or an LTE BS. In a twelfth aspect, alone or in combination with one or more of the first through eleventh aspects, the first BS is a 5G NR BS, the overheating assistance information communication includes a reducedUE-Category parameter, associated with the first BS, indicating a maximum throughput for the UE, and the method further comprises transmitting, to the second BS, an indication of the reducedUE-Category parameter.

In a thirteenth aspect, alone or in combination with one or more of the first through twelfth aspects, process 700 includes transmitting, to the UE and based at least in part on receiving an indication of an acceptance from the second BS of the request, a radio resource control connection reconfiguration communication to cause the quantity of component carriers of the second BS configured for the UE to be reduced.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
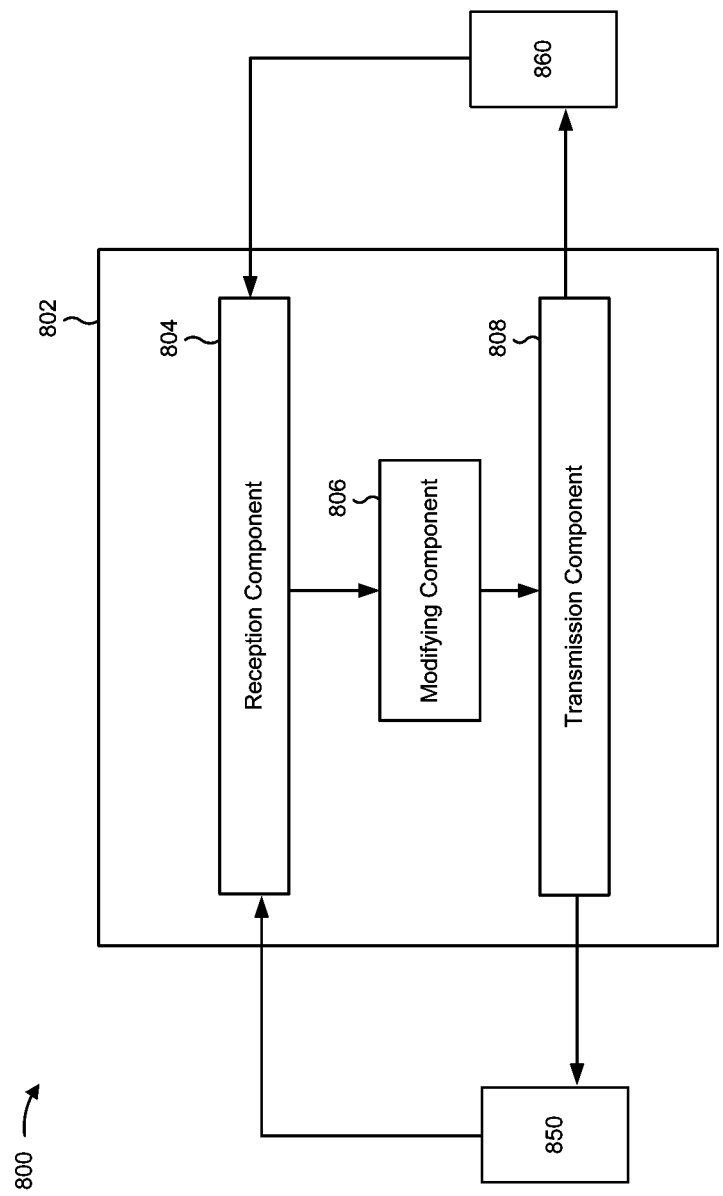
FIG. 8 is a data flow diagram illustrating an example of a data flow between different components in an example apparatus, in accordance with various aspects of the present disclosure.

FIG. 8 is a conceptual data flow diagram 800 illustrating a data flow between different components in an example apparatus 802. The apparatus 802 may be a BS (e.g., BS 110 illustrated and described above in connection with FIGS. 1 and 2, a BS illustrated and described above in one or more of FIGS. 3-7, and/or the like). In some aspects, the apparatus 802 includes a reception component 804, a modifying component 806, and/or a transmission component 808.

In some aspects, the reception component 804 may receive, from another apparatus 850 (e.g., a UE 120), an overheating assistance information communication that indicates a maximum quantity of component carriers, combined between the apparatus 802 and another apparatus 860 (e.g., another BS), for the apparatus 850. In some aspects, transmission component 808 may transmit, to the apparatus 860 and based at least in part on reception component 804 receiving the overheating assistance information communication, a request to reduce a quantity of component carriers of the apparatus 860 configured for the apparatus 850 such that a total quantity of component carriers, between the apparatus 802 and the apparatus 860, configured for the apparatus 850 satisfies the maximum quantity of component carriers. In some aspects, transmission component 808 may transmit, to the apparatus 850 and based at least in part on reception component 804 receiving an indication of an acceptance from the apparatus 860 of the request, a radio resource control connection reconfiguration communication to cause the quantity of component carriers of the apparatus 860 configured for the apparatus 850 to be reduced.

In some aspects, the transmission component 808 may transmit, to the apparatus 860, an indication of one or more overheating assistance parameters indicated in the overheating assistance information communication. In some aspects, the reception component 804 may receive, from the apparatus 860, an indication of a rejection of the request to reduce the quantity of component carriers of the apparatus 860 configured for the apparatus 850. In some aspects, modifying component 808 may modify the request to reduce the quantity of component carriers of the apparatus 860 configured for the apparatus 850 based at least in part on reception component 804 receiving the indication of the rejection. In some aspects, transmission component 808 may retransmit, to the apparatus 860, the request to reduce the quantity of component carriers of the apparatus 860 configured for the apparatus 850 after modifying component 806 modifies the request to reduce the quantity of component carriers of the apparatus 860 configured for the apparatus 850. In some aspects, the reception component 804 may receive, from the apparatus 860, the indication of the acceptance of the request to reduce the quantity of component carriers of the apparatus 860 configured for the apparatus 850 based at least in part on retransmitting the request to reduce the quantity of component carriers of the apparatus 860 configured for the apparatus 850.

In some aspects, reception component 804 may receive, from the apparatus 860, an indication of a different reduced quantity of component carriers of the apparatus 860 for the apparatus 850. In some aspects, modifying component 806 may modify the request to reduce the quantity of component carriers of the apparatus 860 configured for the apparatus 850 based at least in part on the different reduced quantity of component carriers of the apparatus 860 for the apparatus 850. In some aspects, transmission component 808 may retransmit, to the apparatus 860, the request to reduce the quantity of component carriers of the apparatus 860 configured for the apparatus 850 after modifying component 806 modifies the request to reduce the quantity of component carriers of the apparatus 860 configured for the apparatus 850. In some aspects, reception component 804 may receive, from the apparatus 860, the indication of the acceptance of the request to reduce the quantity of component carriers of the apparatus 860 configured for the apparatus 850 based at least in part on transmission component 808 retransmitting the request to reduce the quantity of component carriers of the apparatus 860 configured for the apparatus 850.

In some aspects, the reception component 804 may include an antenna (e.g., antenna 234), a MIMO detector (e.g., MIMO detector 236), a receive processor (e.g., receive processor 238), a controller/processor (e.g., controller/processor 240), a memory (e.g., memory 242), and/or the like. In some aspects, the modifying component 806 may include a receive processor (e.g., receive processor 238), a transmit processor (e.g., transmit processor 220), a controller/processor (e.g., controller/processor 240), a memory (e.g., memory 242), and/or the like. In some aspects, the transmission component 808 may include an antenna (e.g., antenna 234), a TX MIMO processor (e.g., TX MIMO processor 230), a transmit processor (e.g., transmit processor 220), a controller/processor (e.g., controller/processor 240), a memory (e.g., a memory 242), and/or the like.

The apparatus may include additional components that perform each of the blocks of the algorithm in the aforementioned process 700 of FIG. 7 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
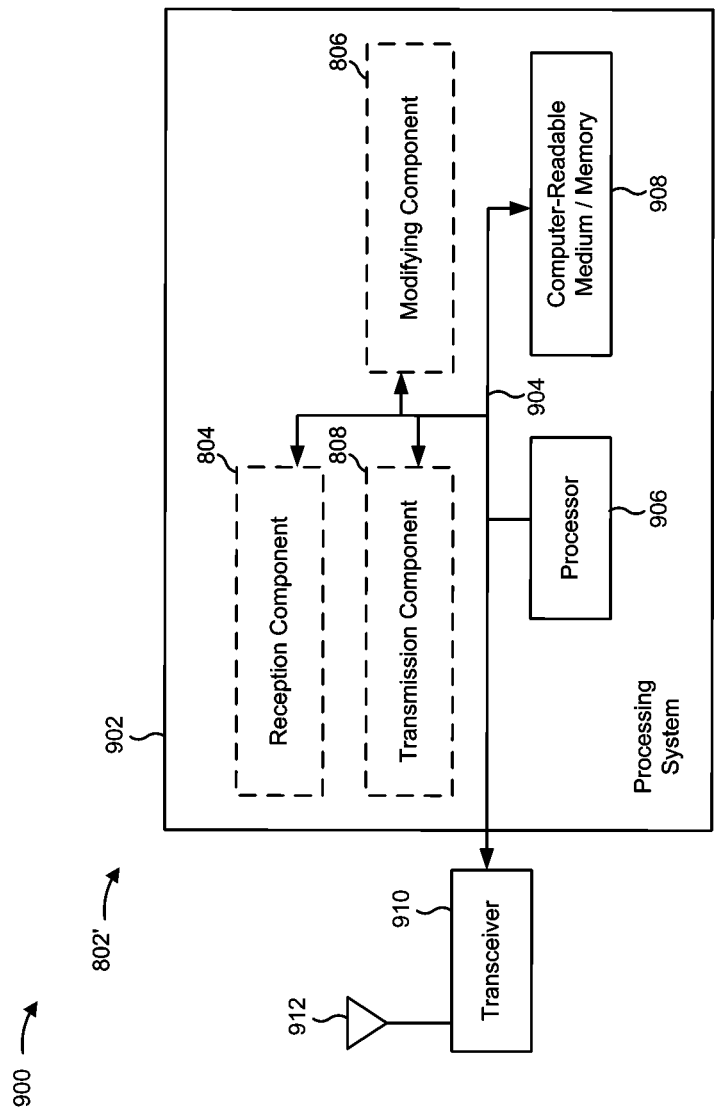
FIG. 9 is a diagram illustrating an example of a hardware implementation for an apparatus employing a processing system, in accordance with various aspects of the present disclosure.

FIG. 9 is a diagram 900 illustrating an example of a hardware implementation for an apparatus 802' employing a processing system 902. The apparatus 802' may be BS (e.g., BS 110 illustrated and described above in connection with FIGS. 1 and 2, a BS illustrated and described above in one or more of FIGS. 3-7, and/or the like).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware components, represented by the processor 906, the components 804, 806, 808, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception component 804. In addition, the transceiver 910 receives information from the processing system 902, specifically the transmission component 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the components 804, 806, and 808. The components may be software modules running in the processor 906, resident/stored in the computer-readable medium/memory 908, one or more hardware modules coupled to the processor 906, or some combination thereof. The processing system 902 may be a component of the BS and may include the memory 242 and/or at least one of the transmit processor 220, the TX MIMO processor 230, the receive processor 238, and/or the controller/processor 240.

In some aspects, the apparatus 802/802' for wireless communication includes means for receiving, from another apparatus 850 (e.g., a UE 120), an overheating assistance information communication that indicates a maximum quantity of component carriers, combined between the apparatus 802/802' and another apparatus 860 (e.g., another BS), for the apparatus 850, means for transmitting, to the apparatus 860 and based at least in part on receiving the overheating assistance information communication, a request to reduce a quantity of component carriers of the apparatus 860 configured for the apparatus 850 such that a total quantity of component carriers, between the apparatus 802/802' and the apparatus 860, configured for the 850 satisfies the maximum quantity of component carriers, means for transmitting, to the apparatus 850 and based at least in part on receiving an indication of an acceptance from the apparatus 860 of the request, a radio resource control connection reconfiguration communication to cause the quantity of component carriers of the apparatus 860 configured for the apparatus 850 to be reduced. In some aspects, the apparatus 802/802' for wireless communication includes means for transmitting, to the apparatus 860, an indication of one or more overheating assistance parameters indicated in the overheating assistance information communication.

In some aspects, the apparatus 802/802' for wireless communication includes means for receiving, from the apparatus 860, an indication of a rejection of the request to reduce the quantity of component carriers of the apparatus 860 configured for the apparatus 850, means for modifying the request to reduce the quantity of component carriers of the apparatus 860 configured for the apparatus 850 based at least in part on receiving the indication of the rejection, means for retransmitting, to the apparatus 860, the request to reduce the quantity of component carriers of the apparatus 860 configured for the apparatus 850 after modifying the request to reduce the quantity of component carriers of the apparatus 860 configured for the apparatus 850, and means for receiving, from the apparatus 860, the indication of the acceptance of the request to reduce the quantity of component carriers of the apparatus 860 configured for the apparatus 850 based at least in part on retransmitting the request to reduce the quantity of component carriers of the apparatus 860 configured for the apparatus 850.

In some aspects, the apparatus 802/802' for wireless communication includes means for receiving, from the apparatus 860, an indication of a different reduced quantity of component carriers of the apparatus 860 for the apparatus 850, means for modifying the request to reduce the quantity of component carriers of the apparatus 860 configured for the apparatus 850 based at least in part on the different reduced quantity of component carriers of the apparatus 860 for the apparatus 850, means for retransmitting, to the apparatus 860, the request to reduce the quantity of component carriers of the apparatus 860 configured for the apparatus 850 after modifying the request to reduce the quantity of component carriers of the apparatus 860 configured for the apparatus 850, and means for receiving, from the apparatus 860, the indication of the acceptance of the request to reduce the quantity of component carriers of the apparatus 860 configured for the apparatus 850 based at least in part on retransmitting the request to reduce the quantity of component carriers of the apparatus 860 configured for the apparatus 850.

The aforementioned means may be one or more of the aforementioned components of the apparatus 802 and/or the processing system 902 of the apparatus 802' configured to perform the functions recited by the aforementioned means. As described elsewhere herein, the processing system 902 may include the transmit processor 220, the TX MIMO processor 230, the receive processor 238, and/or the controller/processor 240. In one configuration, the aforementioned means may be the transmit processor 220, the TX MIMO processor 230, the receive processor 238, and/or the controller/processor 240 configured to perform the functions and/or operations recited herein.

The following provides an overview of aspects of the present disclosure:

Aspect 1: A method of wireless communication performed by a first base station (BS), comprising: receiving, from a user equipment (UE), an overheating assistance information communication that indicates a maximum quantity of component carriers, combined between the first BS and a second BS, for the UE; and transmitting, to the second BS and based at least in part on receiving the overheating assistance information communication, a request to reduce a quantity of component carriers of the second BS configured for the UE such that a total quantity of component carriers, between the first BS and the second BS, configured for the UE satisfies the maximum quantity of component carriers.

Aspect 2: The method of aspect 1, further comprising: transmitting, to the UE and based at least in part on receiving an indication of an acceptance from the second BS of the request, a radio resource control connection reconfiguration communication to cause the quantity of component carriers of the second BS configured for the UE to be reduced. Aspect 3: The method of aspect 1 or 2, wherein transmitting the request comprises: transmitting the request via an Xn backhaul interface or an X2 backhaul interface.

Aspect 4: The method of any of aspects 1-3, further comprising: transmitting, to the second BS, an indication of one or more overheating assistance parameters indicated in the overheating assistance information communication, wherein the one or more overheating assistance parameters include at least one of: the maximum quantity of component carriers, a maximum throughput for the UE, a maximum New Radio (NR) frequency range 1 (FR1) bandwidth for the UE, a maximum NR frequency range 2 (FR2) bandwidth for the UE, a maximum quantity of FR1 multiple input multiple output (MIMO) layers for the UE, or a maximum quantity of FR2 MIMO layers for the UE.

Aspect 5: The method of any of aspects 1-4, wherein maximum quantity of component carriers includes at least one of: a maximum quantity of downlink component carriers, combined between the first BS and the second BS, for the UE, or a maximum quantity of uplink component carriers, combined between the first BS and the second BS, for the UE; and wherein the request to reduce the quantity of component carriers of the second BS configured for the UE comprises: a request to release one or more downlink secondary cells (SCells) of the second BS for the UE, or a request to release one or more uplink SCells of the second BS for the UE. Aspect 6: The method of aspect 5, wherein the one or more downlink SCells are indicated in an sCellToReleaseList information element; and wherein the one or more uplink SCells are indicated in an sCellToReleaseList-UL information element.

Aspect 7: The method of aspect 4, further comprising: receiving, from the second BS, an indication of a rejection of the request to reduce the quantity of component carriers of the second BS configured for the UE; modifying the request to reduce the quantity of component carriers of the second BS configured for the UE based at least in part on receiving the indication of the rejection; retransmitting, to the second BS, the request to reduce the quantity of component carriers of the second BS configured for the UE after modifying the request to reduce the quantity of component carriers of the second BS configured for the UE; and receiving, from the second BS, the indication of the acceptance of the request to reduce the quantity of component carriers of the second BS configured for the UE based at least in part on retransmitting the request to reduce the quantity of component carriers of the second BS configured for the UE. Aspect 8: The method of aspect 7, wherein the rejection of the request indicates at least one of: one or more different downlink SCells in an sCellToReleaseList information element, or one or more different uplink SCells in an sCellToReleaseList-UL information element.

Aspect 9: The method of any of aspects 1-8, wherein the request to reduce the quantity of component carriers of the second BS configured for the UE comprises: an indication of a reduced quantity of component carriers of the second BS for the UE, wherein the reduced quantity of component carriers is indicated in a reducedMaxCCs_SN information element. Aspect 10: The method of aspect 9, further comprising: receiving, from the second BS, an indication of a different reduced quantity of component carriers of the second BS for the UE; modifying the request to reduce the quantity of component carriers of the second BS configured for the UE based at least in part on the different reduced quantity of component carriers of the second BS for the UE; retransmitting, to the second BS, the request to reduce the quantity of component carriers of the second BS configured for the UE after modifying the request to reduce the quantity of component carriers of the second BS configured for the UE; and receiving, from the second BS, the indication of the acceptance of the request to reduce the quantity of component carriers of the second BS configured for the UE based at least in part on retransmitting the request to reduce the quantity of component carriers of the second BS configured for the UE.

Aspect 11: The method of aspect 10, wherein the different reduced quantity of component carriers is indicated in a reducedMaxCCs_SN information element of a secondary node (SN) modification/addition request acknowledgement communication; and wherein the SN modification/addition request acknowledgement communication indicates rejection of the request to reduce the quantity of component carriers of the second BS configured for the UE. Aspect 12: The method of aspect 10, wherein the different reduced quantity of component carriers is indicated in a reducedMaxCCs_SN information element of a secondary node modification required communication.

Aspect 13: The method of any of aspects 1-12, wherein the first BS is a fifth generation New Radio (5G NR) BS; wherein the overheating assistance information communication includes a reducedUE-Category parameter, associated with the first BS, indicating a maximum throughput for the UE; and wherein the method further comprises: transmitting, to the second BS, an indication of the reducedUE-Category parameter. Aspect 14: The method of any of aspects 1-13, wherein the one or more downlink SCells are indicated in an sCellToReleaseList information element; and wherein the one or more uplink SCells are indicated in an sCellToReleaseList-UL information element.

Aspect 15: An apparatus for wireless communication at a device, comprising a processor; memory coupled with the processor; and instructions stored in the memory and executable by the processor to cause the apparatus to perform the method of one or more aspects of aspects 1-14. Aspect 16: A device for wireless communication, comprising a memory and one or more processors coupled to the memory, the memory and the one or more processors configured to perform the method of one or more aspects of aspects 1-14. Aspect 17: An apparatus for wireless communication, comprising at least one means for performing the method of one or more aspects of aspects 1-14.

Aspect 18: A non-transitory computer-readable medium storing code for wireless communication, the code comprising instructions executable by a processor to perform the method of one or more aspects of aspects 1-14. Aspect 19: A non-transitory computer-readable medium storing a set of instructions for wireless communication, the set of instructions comprising one or more instructions that, when executed by one or more processors of a device, cause the device to perform the method of one or more aspects of aspects 1-14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first network entity, comprising:
   receiving, from a user equipment (UE), information that indicates one or more overheating assistance parameters and a maximum quantity of component carriers, combined between the first network entity and a second network entity, for the UE;
   transmitting, to the second network entity and based at least in part on receiving the information, a request to reduce a quantity of component carriers of the second network entity configured for the UE such that a total quantity of component carriers, combined between the first network entity and the second network entity, configurable for the UE satisfies the maximum quantity of component carriers; and
   transmitting, to the second network entity, an indication of one or more of the one or more overheating assistance parameters,
      wherein the one or more overheating assistance parameters include at least one of:
         a maximum New Radio (NR) frequency range 1 (FR1) bandwidth for the UE,
         a maximum NR frequency range 2 (FR2) bandwidth for the UE,
         a maximum quantity of FR1 multiple input multiple output (MIMO) layers for the UE, or
         a maximum quantity of FR2 MIMO layers for the UE.

2. The method of claim 1, further comprising:
   transmitting, to the UE and based at least in part on receiving an indication of an acceptance from the second network entity of the request, a radio resource control connection reconfiguration communication to cause the quantity of component carriers of the second network entity configured for the UE to be reduced.

3. The method of claim 1, wherein transmitting the request comprises:
   transmitting the request via an Xn backhaul interface or an X2 backhaul interface.

4. The method of claim 1, wherein the one or more overheating assistance parameters further include at least one of the maximum quantity of component carriers or a maximum throughput for the UE.

5. The method of claim 1, wherein the maximum quantity of component carriers includes at least one of:
   a maximum quantity of downlink component carriers, combined between the first network entity and the second network entity, for the UE, or
   a maximum quantity of uplink component carriers, combined between the first network entity and the second network entity, for the UE; and
   wherein the request to reduce the quantity of component carriers of the second network entity configured for the UE comprises:
      a request to release one or more downlink secondary cells (SCells) of the second network entity for the UE, or
      a request to release one or more uplink SCells of the second network entity for the UE.

6. The method of claim 5, wherein the one or more downlink SCells are indicated in an sCellToReleaseList information element; and
   wherein the one or more uplink SCells are indicated in an sCellToReleaseList-UL information element.

7. The method of claim 1, further comprising:
   receiving, from the second network entity, an indication of a rejection of the request to reduce the quantity of component carriers of the second network entity configured for the UE;

modifying the request to reduce the quantity of component carriers of the second network entity configured for the UE based at least in part on receiving the indication of the rejection;
retransmitting, to the second network entity, the request to reduce the quantity of component carriers of the second network entity configured for the UE after modifying the request to reduce the quantity of component carriers of the second network entity configured for the UE; and
receiving, from the second network entity, the indication of an acceptance of the request to reduce the quantity of component carriers of the second network entity configured for the UE based at least in part on retransmitting the request to reduce the quantity of component carriers of the second network entity configured for the UE.

8. The method of claim 7, wherein the rejection of the request indicates at least one of:
one or more different downlink SCells in an sCellToReleaseList information element, or
one or more different uplink SCells in an sCellToReleaseList-UL information element.

9. The method of claim 1, wherein the request to reduce the quantity of component carriers of the second network entity configured for the UE comprises:
an indication of a reduced quantity of component carriers of the second network entity for the UE,
wherein the reduced quantity of component carriers is indicated in a reducedMaxCCs_SN information element.

10. The method of claim 9, further comprising:
receiving, from the second network entity, an indication of a different reduced quantity of component carriers of the second network entity for the UE;
modifying the request to reduce the quantity of component carriers of the second network entity configured for the UE based at least in part on the different reduced quantity of component carriers of the second network entity for the UE;
retransmitting, to the second network entity, the request to reduce the quantity of component carriers of the second network entity configured for the UE after modifying the request to reduce the quantity of component carriers of the second network entity configured for the UE; and
receiving, from the second network entity, the indication of an acceptance of the request to reduce the quantity of component carriers of the second network entity configured for the UE based at least in part on retransmitting the request to reduce the quantity of component carriers of the second network entity configured for the UE.

11. The method of claim 10, wherein the different reduced quantity of component carriers is indicated in a reducedMaxCCs_SN information element of a secondary node (SN) modification/addition request acknowledgement communication; and
wherein the SN modification/addition request acknowledgement communication indicates rejection of the request to reduce the quantity of component carriers of the second network entity configured for the UE.

12. The method of claim 10, wherein the different reduced quantity of component carriers is indicated in a reducedMaxCCs_SN information element of a secondary node modification required communication.

13. The method of claim 1, wherein the first network entity is a fifth generation New Radio (5G NR) base station (BS);

wherein the information further indicates a reducedUE-Category parameter, associated with the first network entity, indicating a maximum throughput for the UE; and
wherein the method further comprises:
transmitting, to the second network entity, an indication of the reducedUE-Category parameter.

14. A first network entity for wireless communication, comprising:
a memory comprising instructions; and
one or more processors configured to execute the instructions and cause the first network entity to:
receive, from a user equipment (UE), information that indicates one or more overheating assistance parameters and a maximum quantity of component carriers, combined between the first network entity and a second network entity, configurable for the UE;
transmit, to the second network entity and based at least in part on receiving the information, a request to reduce a quantity of component carriers of the second network entity configured for the UE such that a total quantity of component carriers, combined between the first network entity and the second network entity, configurable for the UE satisfies the maximum quantity of component carriers; and
transmit, to the second network entity, an indication of one or more of the one or more overheating assistance parameters,
wherein the one or more overheating assistance parameters include:
a maximum New Radio (NR) frequency range 1 (FR1) bandwidth for the UE,
a maximum NR frequency range 2 (FR2) bandwidth for the UE,
a maximum quantity of FR1 multiple input multiple output (MIMO) layers for the UE, and
a maximum quantity of FR2 MIMO layers for the UE.

15. The first network entity of claim 14, wherein the one or more processors are further configured to execute the instructions and cause the first network entity to:
transmit, to the UE and based at least in part on receiving an indication of an acceptance from the second network entity of the request, a radio resource control connection reconfiguration communication to cause the quantity of component carriers of the second network entity configured for the UE to be reduced.

16. The first network entity of claim 14, wherein the one or more processors, when transmitting the request, are configured to execute the instructions and cause the first network entity to:
transmit the request via an Xn backhaul interface or an X2 backhaul interface.

17. The first network entity of claim 14, wherein the one or more overheating assistance parameters further include at least one of the maximum quantity of component carriers or a maximum throughput for the UE.

18. The first network entity of claim 14, wherein the maximum quantity of component carriers includes at least one of:
a maximum quantity of downlink component carriers, combined between the first network entity and the second network entity, for the UE, or
a maximum quantity of uplink component carriers, combined between the first network entity and the second network entity, for the UE; and wherein the request to reduce the quantity of component carriers of the second network entity configured for the UE comprises:
  a request to release one or more downlink secondary cells (SCells) of the second network entity for the UE, or
  a request to release one or more uplink SCells of the second network entity for the UE.

19. The first network entity of claim 18, wherein the one or more downlink SCells are indicated in an sCellToReleaseList information element; and
  wherein the one or more uplink SCells are indicated in an sCellToReleaseList-UL information element.

20. The first network entity of claim 18, wherein the one or more processors are further configured to execute the instructions and cause the first network entity to:
  receive, from the second network entity, an indication of a rejection of the request to reduce the quantity of component carriers of the second network entity configured for the UE;
  modify the request to reduce the quantity of component carriers of the second network entity configured for the UE based at least in part on receiving the indication of the rejection;
  retransmit, to the second network entity, the request to reduce the quantity of component carriers of the second network entity configured for the UE after modifying the request to reduce the quantity of component carriers of the second network entity configured for the UE; and
  receive, from the second network entity, the indication of an acceptance of the request to reduce the quantity of component carriers of the second network entity configured for the UE based at least in part on retransmitting the request to reduce the quantity of component carriers of the second network entity configured for the UE.

21. The first network entity of claim 20, wherein the rejection of the request indicates at least one of:
  one or more different downlink SCells in an sCellToReleaseList information element, or
  one or more different uplink SCells in an sCellToReleaseList-UL information element.

22. The first network entity of claim 14, wherein the request to reduce the quantity of component carriers of the second network entity configured for the UE comprises:
  an indication of a reduced quantity of component carriers of the second network entity for the UE,
    wherein the reduced quantity of component carriers is indicated in a reducedMaxCCs_SN information element.

23. The first network entity of claim 22, wherein the one or more processors are further configured to execute the instructions and cause the first network entity to:
  receive, from the second network entity, an indication of a different reduced quantity of component carriers of the second network entity for the UE;
  modify the request to reduce the quantity of component carriers of the second network entity configured for the UE based at least in part on the different reduced quantity of component carriers of the second network entity for the UE;
  retransmit, to the second network entity, the request to reduce the quantity of component carriers of the second network entity configured for the UE after modifying the request to reduce the quantity of component carriers of the second network entity configured for the UE; and
  receive, from the second network entity, the indication of an acceptance of the request to reduce the quantity of component carriers of the second network entity configured for the UE based at least in part on retransmitting the request to reduce the quantity of component carriers of the second network entity configured for the UE.

24. The first network entity of claim 23, wherein the different reduced quantity of component carriers is indicated in a reducedMaxCCs_SN information element of a secondary node (SN) modification/addition request acknowledgement communication; and
  wherein the SN modification/addition request acknowledgement communication indicates rejection of the request to reduce the quantity of component carriers of the second network entity configured for the UE.

25. The first network entity of claim 23, wherein the different reduced quantity of component carriers is indicated in a reducedMaxCCs_SN information element of a secondary node modification required communication.

26. The first network entity of claim 14, wherein the first network entity is a fifth generation New Radio (5G NR) base station (BS);
  wherein the information includes a reducedUE-Category parameter, associated with the first network entity, indicating a maximum throughput for the UE; and
  wherein the one or more processors are further configured to:
    transmit, to the second network entity, an indication of the reducedUE-Category parameter.

27. A non-transitory computer-readable medium storing one or more instructions for wireless communication, the one or more instructions comprising:
  one or more instructions that, when executed by one or more processors of a first network entity, cause the one or more processors to:
    receive, from a user equipment (UE), information that indicates one or more overheating assistance parameters and a maximum quantity of component carriers, combined between the first network entity and a second network entity, configurable for the UE;
    transmit, to the second network entity and based at least in part on receiving the information, a request to reduce a quantity of component carriers of the second network entity configured for the UE such that a total quantity of component carriers, combined between the first network entity and the second network entity, configurable for the UE satisfies the maximum quantity of component carriers; and
    transmit, to the second network entity, an indication of one or more of the one or more overheating assistance parameters,
      wherein the one or more overheating assistance parameters include:
        a maximum New Radio (NR) frequency range 1 (FR1) bandwidth for the UE,
        a maximum NR frequency range 2 (FR2) bandwidth for the UE,
        a maximum quantity of FR1 multiple input multiple output (MIMO) layers for the UE, and
        a maximum quantity of FR2 MIMO layers for the UE.

28. The non-transitory computer-readable medium of claim 27, wherein the one or more instructions, when executed by the one or more processors, further cause the one or more processors to:

transmit, to the UE and based at least in part on receiving an indication of an acceptance from the second network entity of the request, a radio resource control connection reconfiguration communication to cause the quantity of component carriers of the second network entity configured for the UE to be reduced.

29. A first apparatus for wireless communication, comprising:
means for receiving, from a user equipment (UE), information that indicates one or more overheating assistance parameters and a maximum quantity of component carriers, combined between the first apparatus and a second apparatus, for the UE; and
means for transmitting, to the second apparatus and based at least in part on receiving the information, a request to reduce a quantity of component carriers of the second apparatus configured for the UE such that a total quantity of component carriers, combined between the first apparatus and the second apparatus, configured for the UE satisfies the maximum quantity of component carriers; and
means for transmitting, to the second apparatus, an indication of one or more of the one or more overheating assistance parameters,
wherein the one or more overheating assistance parameters include at least one of:
a maximum New Radio (NR) frequency range 1 (FR1) bandwidth for the UE,
a maximum NR frequency range 2 (FR2) bandwidth for the UE,
a maximum quantity of FR1 multiple input multiple output (MIMO) layers for the UE, or
a maximum quantity of FR2 MIMO layers for the UE.

30. The first apparatus of claim 29, further comprising:
means for transmitting, to the UE and based at least in part on receiving an indication of an acceptance from the second apparatus of the request, a radio resource control connection reconfiguration communication to cause the quantity of component carriers of the second apparatus configured for the UE to be reduced.

* * * * *